United States Patent [19]

Rosen

[11] Patent Number: 4,779,930
[45] Date of Patent: Oct. 25, 1988

[54] INFANT HEAD SUPPORT FOR USE WITH INFANT RETAINING DEVICES

[76] Inventor: Steven B. Rosen, 27833 N. Glasser Ave., Canyon Country, Calif. 91351

[21] Appl. No.: 97,833

[22] Filed: Sep. 17, 1987

[51] Int. Cl.[4] .......................................... A47D 15/00
[52] U.S. Cl. .................................. 297/464; 297/460; 297/486; 297/391; 297/397
[58] Field of Search .............. 297/464, 397, 486, 460, 297/391, 396, DIG. 5, 394

[56] References Cited

U.S. PATENT DOCUMENTS

| | | | |
|---|---|---|---|
| 3,165,355 | 1/1965 | Hitchcock et al. | 297/460 X |
| 3,608,964 | 9/1971 | Earl | 297/397 |
| 4,234,228 | 11/1980 | Flamm | 297/464 |
| 4,385,713 | 5/1983 | Roston | 297/464 |
| 4,402,548 | 9/1983 | Mason | 297/464 |
| 4,436,341 | 3/1984 | Converse | 297/464 |
| 4,439,472 | 3/1984 | Bell | 297/DIG. 5 |
| 4,441,221 | 4/1984 | Enste et al. | 297/464 |
| 4,679,854 | 7/1987 | Putsch et al. | 297/464 |

Primary Examiner—Francis K. Zugel

[57] ABSTRACT

An infant head support for use with infant retaining devices, such as automobile auxiliary seats, infant carriers, swing seats, baby strollers and the like, used for the retention of infants and early age children. The head support comprises a somewhat dense but resilient foam member which is adapted to fit within a pair of opposed side walls on the infant retaining device, e.g. a pair of forwardly extending flange portions on an infant seat. The foam member is formed with a first opening generally sized to conform to and receive the head of an infant. A second opening, which is larger than the first opening, is sized to engage the shoulders and the upper arm portions of the infant. Moreover, the dense but resilient foam member can be captured between the opposed walls on the infant retaining device so that it retains the infant's head in a fixed position. The infant's head creates outwardly projected lateral forces on the foam member which are opposed by the walls of the infant retaining device and thereby retains the infant's head in a position generally aligned with the torso at a point in the life of the infant when the neck muscles are not strong enough to support its head.

22 Claims, 3 Drawing Sheets

INFANT HEAD SUPPORT FOR USE WITH INFANT RETAINING DEVICES

BACKGROUND OF THE INVENTION

1. Field of the Invention

This invention relates in general to certain new and useful improvements in an infant head support for use with infant retaining devices, and more particularly, to an infant head support which is adapted to be easily removably positioned in an infant retaining device for laterally supporting the head of an infant.

2. Background Discussion of the Prior Art

It has long been recognized that it is necessary to support the head of an infant due to the fact that the neck muscles of the infant have not developed to the point where they are capable of supporting the head. Failure to adequately support the head of an infant, even when carrying the infant, can result in a severe injury to, if not a fatality of the infant.

There is a need for an infant head support in both static and dynamic situations. In the static situation, that is, when there is no movement of the infant in a retaining device, there is a need to preclude the head of the infant from rolling from an erect position, or a position of alignment with the torso, to a position where it engages a shoulder. When the infant's head is aligned with the torso, there is no neck muscle fatigue and the infant is capable of sleeping or resting more comfortably.

There is a more pronounced need for infant head support in a dynamic situation, that is, when the retaining device adopts the form of a transporting device and the infant is being moved. In these transporting devices, a movement of the device, as in a turning action, will cause the infant's head to roll to one side toward a shoulder. The need of a head support is even more critical when protecting the infant's head against a sudden jolting movement, as for example, in the case of a sudden impact. This type of movement can be significantly hazardous to the infant, resulting in injury, if not fatality, as mentioned above.

Notwithstanding the well recognized need to support the head of an infant, many types of baby equipment are designed without this requirement for head support. This is particularly true in the case of baby carriages, strollers, swings, auxiliary vehicle seats such as car seats, and the like. As a simple example, in the case of a stroller, safety devices, such as a seat restraining strap and the like, are included. However, there is no feature within the seat portion of the stroller to support the head of the infant. This is particularly distressing in the situation where many of these devices are designed specifically for infants and children of relatively early ages.

In recent years, the use of seat belts for retaining passengers in automotive vehicles, and particularly, passenger automobiles, has been recognized as a significant measure in saving the lives and reducing injuries to the vehicle occupants in the event of a collision or other accident. Moreover, the retention of children and particularly, infants, in auxiliary automotive seats, often referred to as "car seats", has also become recognized as a significant measure in reducing the incidence of death or serious injury to children in automotive vehicles as a result of accidents or collisions. Furthermore, many governmental agencies have enacted laws which mandate the use of auxiliary automotive vehicle seats for children under certain ages, and particularly, for use with infants.

The conventional automotive auxiliary seat for children is adapted to be secured to the conventional seat of the automobile, usually with the available seat belt harness. Moreover, these vehicle seats have been proven to be highly effective for children of one year of age and older, since children of these ages have significantly developed neck muscles to the point that they are at least somewhat capable of preventing their heads from being jolted severely in the event of a vehicle accident or collision. However, children generally under one year of age have not significantly developed neck muscles to the point that they are capable of controlling the movement of their head in the event of a serious collision of the vehicle and which might result in the sudden throwing or jolting of their head from side to side.

The conventional auxiliary automotive vehicle seats which are adapted to retain children are usually constructed so that they are capable of retaining children over a large age range. Thus, the conventional auxiliary automotive vehicle seat may be adapted to hold a child from age one month to about five years. It may be appreciated that over this time span, the size of the child will significantly increase. As a result, the auxiliary car seats must be constructed so that they are capable of receiving a child commensurate with the size in the oldest of this age range. Thus, the vehicle seat is not particularly adapted to adequately and properly support the head of an infant.

There has been at least one proposed vehicle seat device which is adapted to assume excess space between at least portions of an infant's body and an automotive vehicle seat. This device is essentially a slab of foam-like material formed with a shallow recess designed to somewhat conform to the contour of the infant's body, and is hereinafter described in more detail. However, this type of device is not very effective in that it does not adequately support the head of an infant, if at all, when carried in a vehicle seat.

There is another auxiliary vehicle seat device which is provided for filling the excess space between an infant retaining device and the head and body of an infant and which is commercially offered under the name "Heads Up". This "Head's Up" device is comprised of a flexible cloth back and an inverted U-shaped roll on the upper end of the cloth back. The roll is also comprised of a flexible cloth fabric with about one to one and one-half inch thickness. This latter device is promoted as being capable of extending about the head of an infant to provide support. However, this device essentially has no body or structural integrity and therefore, can provide little or no head support.

This latter prior art device, known as "Heads Up", is not effective in either a static mode or a dynamic mode since it essentially has no form-fit, that is, it does not conform to the head of an infant. Therefore, users of this device have found more effective results in wrapping a towel or other cloth material in the form of a roll to extend about the head of the infant and, in effect, wedge the head of the infant between the side walls of the retaining device.

In addition to the foregoing, the "Heads Up" prior art device is not easily affixed to or readily removeable from many of the infant retaining devices, and particularly, the auxiliarly automobile seats. This device must be secured to the auxiliarly seats by means of the shoulder straps or shoulder harness forming a part of the seat, and it is not only difficult, but it is time consuming to install and to remove.

OBJECTS OF THE INVENTION

It is, therefore, one of the primary objects of the present invention to provide an infant head support for use with infant retaining devices which is adapted to laterally support the head of an infant.

It is an additional object of the present invention to provide an infant head support of the type stated for use with infant retaining devices and which head support provides a type of wedging action to retain an infant child's head in a secure position within the head support and with the head support effectively wedged between a pair of opposed side walls forming part of an infant retaining device.

It is another object of the present invention to provide an infant head support for use with infant retaining devices of the type stated in which the head support can be easily releasably positioned within an infant retaining device and is capable of conforming to and being received by a wide variety of different types of infant retaining devices.

It is a further object of the present invention to provide an infant head support for use with infant retaining devices of the type stated which is formed of a foam or foam-like material for reducing the impact of a sudden force applied to the retaining device.

It is still another object of the present invention to provide an infant head support of the type stated which is highly effective in supporting an infant's head against lateral movement when used in a static mode to preclude an infant's head from rolling to one side or the other, or in a dynamic mode to reduce the impact of a rolling or jolting force on the head of the infant.

It is also an object of the present invention to provide an infant head support of the type stated which can be used with a wide variety of infant retaining devices, including for example, auxiliary car seats, swing seats, baby strollers and the like.

It is another salient object of the present invention to provide an infant head support for use with infant retaining devices of the type stated which can be manufactured at a relatively low cost and which is highly effective and reliable in operation.

With the above and other objects in view, my invention resides in the novel features of form, construction, arrangement, and combination of components presently described and pointed out in the claims.

BRIEF SUMMARY OF THE DISCLOSURE

An infant head support for supporting the head of a small child, and particularly, the head of an infant, in an infant retaining device which may usually, although not necessarily, adopt the form of an infant transporting device.

The infant head support of the present invention is highly effective when used in a static situation or mode as well as in a dynamic situation or mode. In the static situation or mode, the head support is used to prevent a rolling of the head of the infant even where there is no external movement of the infant, as in an infant carrier. In the dynamic situation or mode, the head support is used to cushion against rolling movement of an infant's head caused by a movement of a retaining device in a direction not aligned to the body of the infant, and to cushion against impact.

The infant retaining device may be one designed for merely holding the infant in a stationary position. However, the infant retaining device is generally one designed for movement of an infant, as for example, the aforesaid auxiliary vehicle seat, a swing, a baby carriage, or stroller, or the like. In each of these devices, there is generally a pair of opposed side walls which are spaced apart by a dimension sufficient to receive the head support of the present invention. This dimension between the side walls is typically standard for all forms of children and infant transporting and retaining devices and is therefore generally always the same. The head support is snugly although removeably captured between these walls. Moreover, the head support of the present invention is designed to receive the head of an infant so that the infant's head is retained in the head support.

In the case of a stroller, the structure includes a pair of vertical walls and the head support will fit between and will be engaged by each of the opposed vertical walls. The infant's head would therefore be retained in an opening formed in the head support. In this way, opposite sides of the head support form a type of wedging action to retain a child's head in a comfortable but stable position between the pair of opposed vertical walls. Thus, if a sudden impact or laterally directed force should be imposed upon the stroller or other device in which the child is being transported or retained, the head would not be sharply jolted. Moreover, the infant's head will not roll to a position of non-alignment with the torso.

In one of the preferred embodiments of the present invention, the infant head support is used in an auxiliary vehicle seat often referred to as a child's "car seat". The car seat is of the type which is capable of being attached to the conventional automotive vehicle seat by means of the conventional automotive vehicle shoulder and seat belt harness normally provided with that vehicle. Moreover, the conventional auxiliary automotive vehicle seat usually includes a back wall adapted to support the back and the rear portion of the head of an infant as well as an integrally formed seat portion adapted to receive the buttocks and legs of an infant. A pair of forwardly extending flanges project from the back wall to normally engage the shoulders of an infant disposed within the car seat.

The infant head support of the present invention is normally formed of a foam material, such as a foamed plastic material, and is somewhat arcuately shaped in vertical plan view. The head support is sized to engage the back wall of the infant retaining device and a pair of vertical walls or otherwise vertical flanges on the infant retaining device at its lateral margins. Generally, the vertical walls adopt the form of a pair of vertical flanges in most infant retaining devices as hereinafter described. In the case of an auxiliary vehicle seat, the infant head support is sized to engage the back wall of the auxiliary vehicle seat and to be engaged on its lateral margins by the pair of forwardly projecting flanges of the vehicle seat.

The infant head support is provided with a first arcuately shaped opening extending between the front and back walls thereof and generally sized and located to receive the head of the infant when the head support is disposed in an infant retaining device. The head support is also provided with a second opening extending between the front and back walls thereof and which is somewhat larger than the first opening and which is sized to engage at least a portion of the shoulders and the arms of the infant when seated in the car seat. A somewhat inclined wall connects the first and second openings and this somewhat inclined extending wall is adapted to engage the upper shoulder portions of the infant.

In accordance with this construction, the head of the infant is captured between the interior side walls of the first opening and the shoulders and upper arms are captured between the inner side walls of the second opening. In this way, the head of the infant is stabilized against lateral movement.

This invention possesses many other advantages and has other purposes which may be made more clearly apparent from a consideration of forms in which it may be embodied. These forms are shown in the drawings accompanying and forming part of the present specification. They will now be described in detail for the purpose of illustrating the general principles of the invention; but it is to be understood that such detailed description is not to be taken in a limiting sense.

BRIEF DESCRIPTION OF THE DRAWINGS

Figure 1:
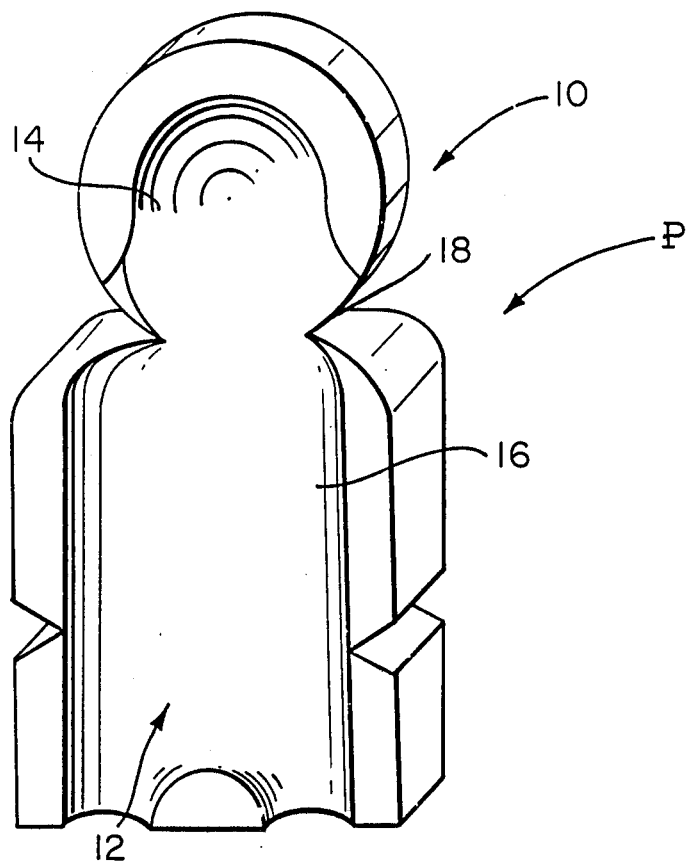
Figure 2:
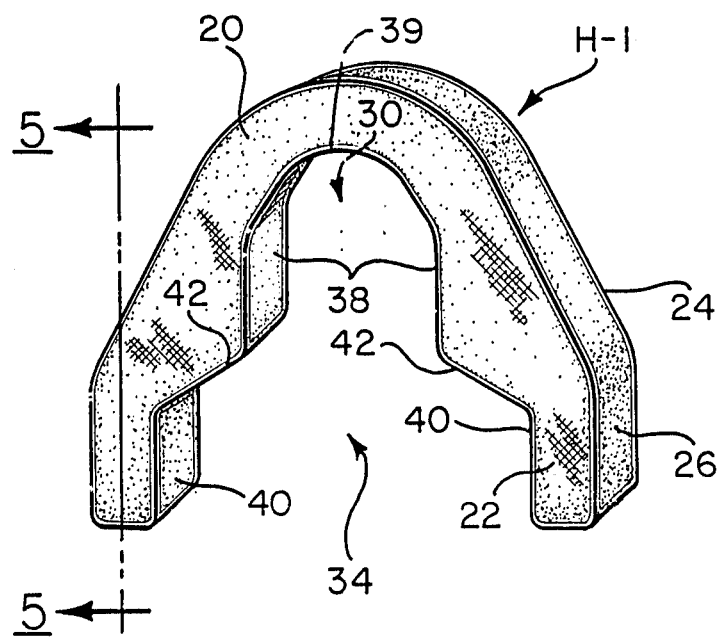
Figure 3:
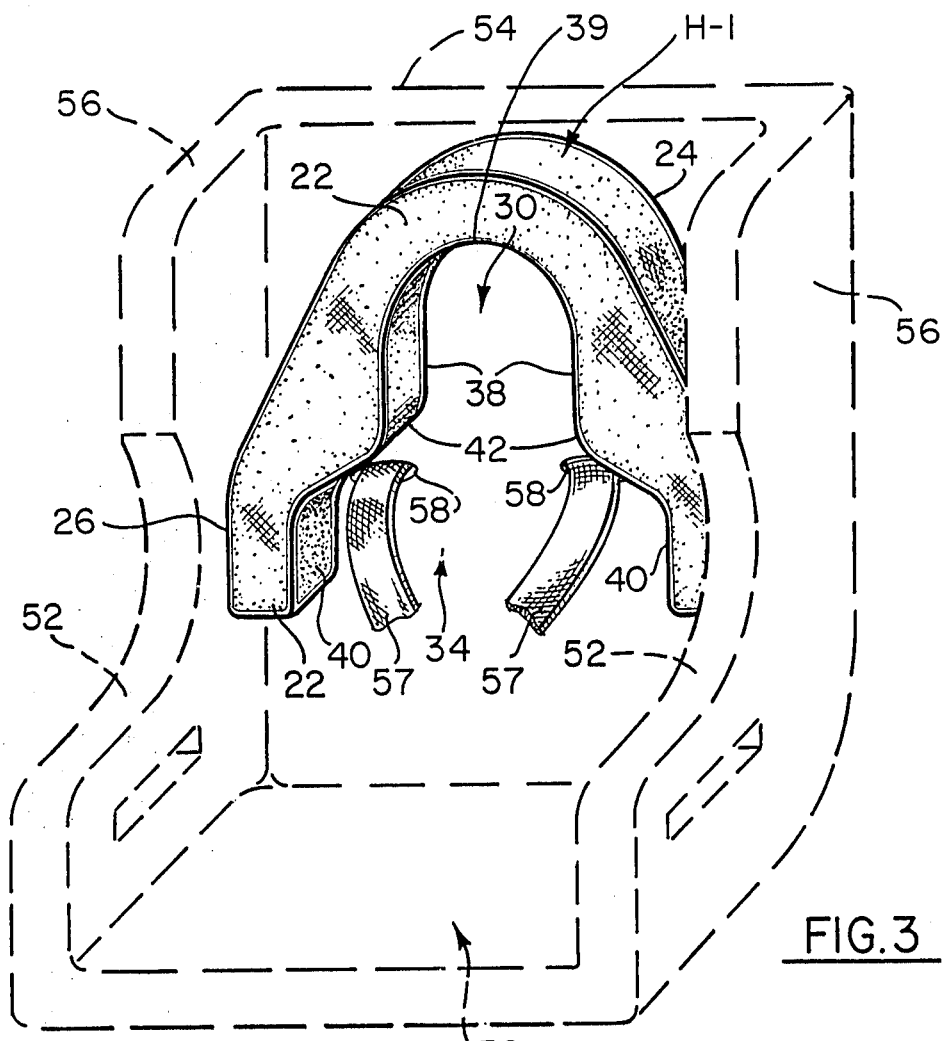
Figure 4:
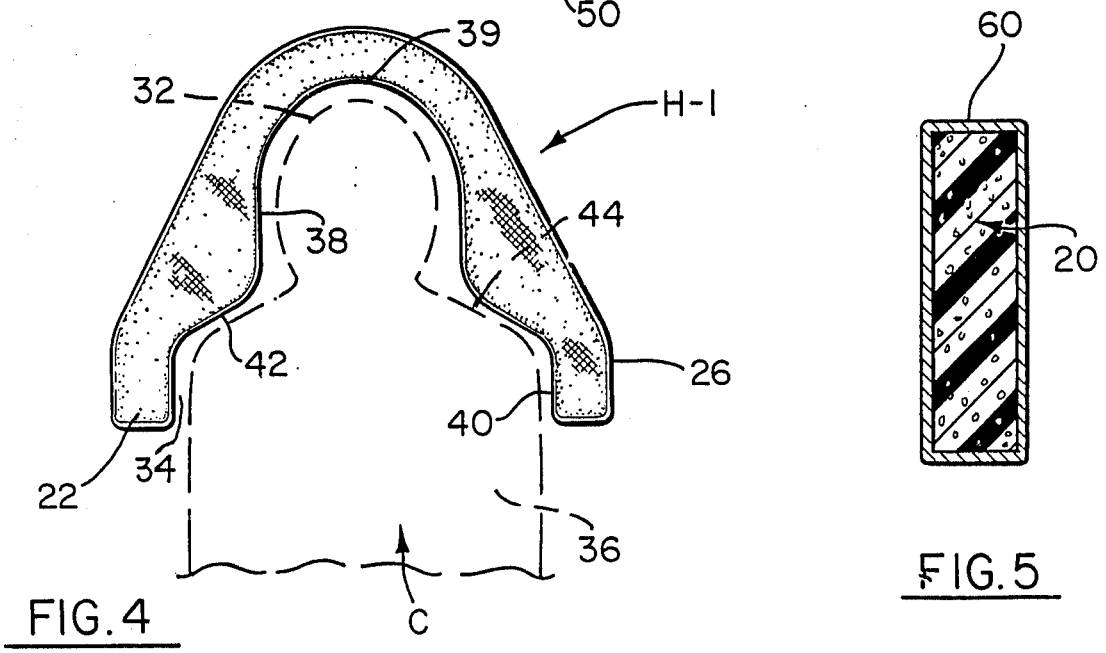
Figure 5:
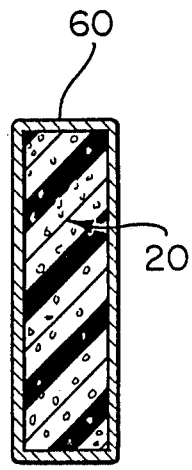
Figure 6:
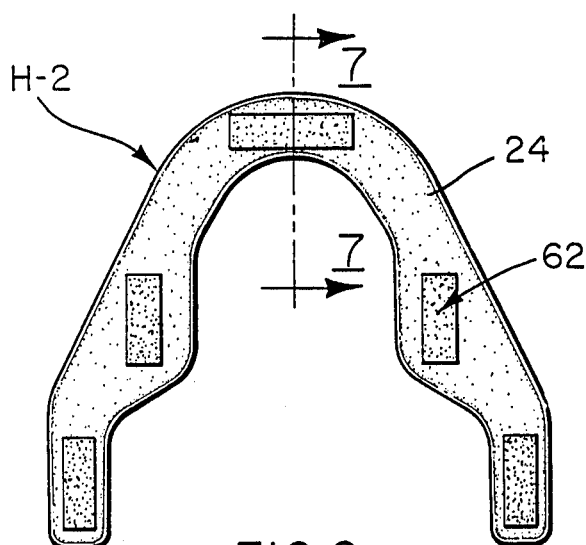
Figure 7:
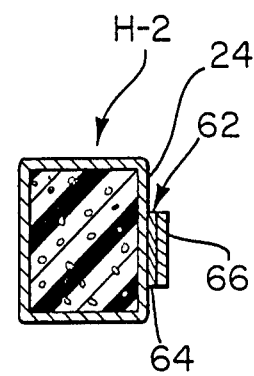
Figure 8:
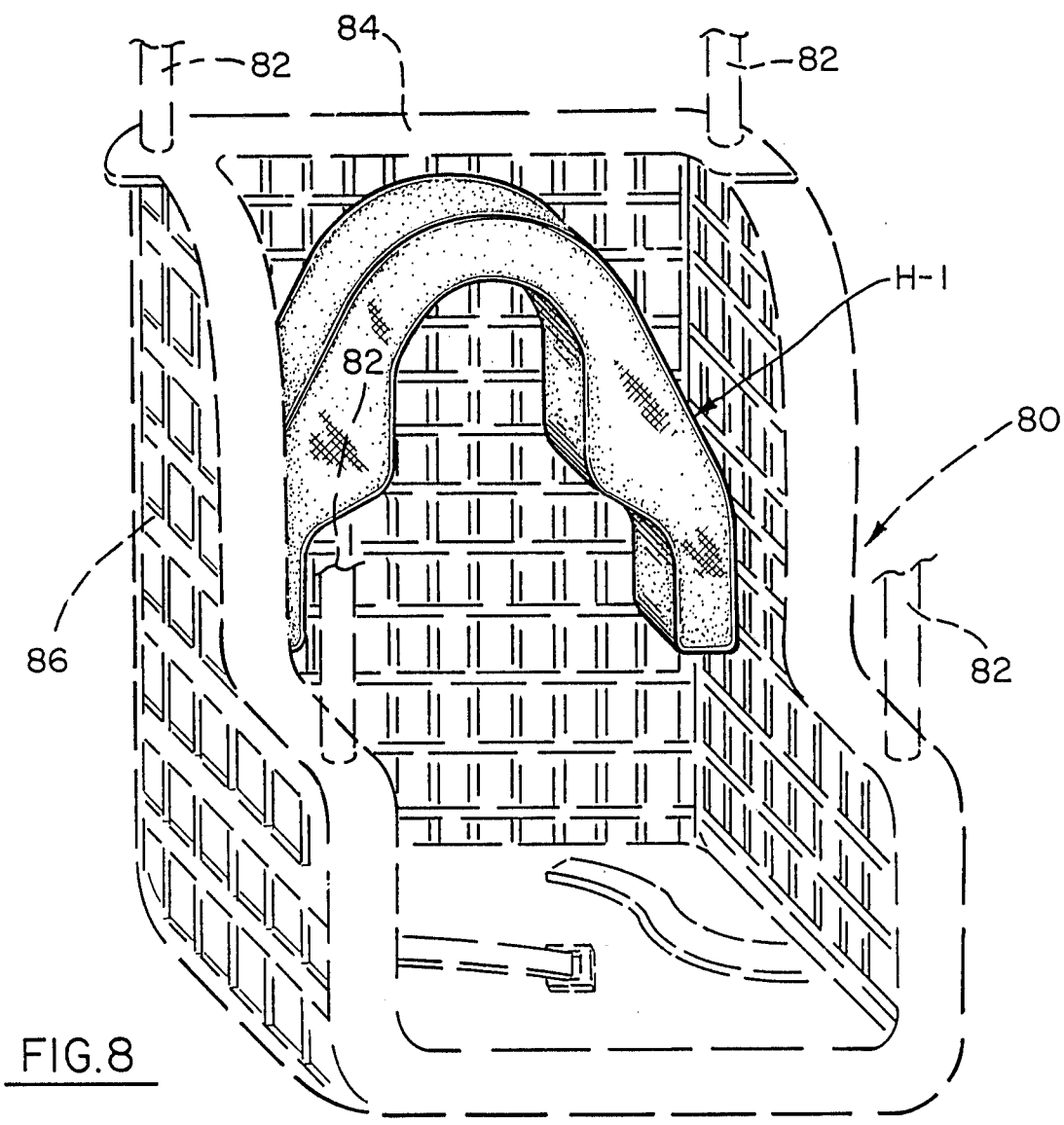

Having thus described the invention in general terms, reference will now be made to the accompanying drawings (three sheets) in which:

FIG. 1 is a perspective view of a prior art device used for retaining a child in an auxiliary vehicle seat;

FIG. 2 is a perspective view of an infant head support constructed in accordance with and embodying the present invention;

FIG. 3 is a perspective view showing the use of the infant head support of the present invention in a conventional auxiliary automotive vehicle seat for children;

FIG. 4 is a front elevational view of the infant head support shown in FIGS. 2 and 3;

FIG. 5 is a vertical sectional view taken along line 5—5 of FIG. 2;

FIG. 6 is a rear elevational view of a modified form of the infant head support constructed in accordance with and embodying the present invention;

FIG. 7 is a fragmentary vertical sectional view taken along line 7—7 of FIG. 6; and FIG. 8 is a perspective view showing the use of the infant head support of the present invention in a conventional baby swing.

DETAILED DESCRIPTION OF PRACTICAL EMBODIMENTS

For purposes of more fully setting forth the principles and operation of the invention, this infant head support will be described, in one embodiment, for use in connection with an auxiliary vehicle seat, such as a so-called "car seat". In another embodiment, the infant head support is described in connection with use in a baby swing. However, it is to be understood that the description as set forth hereinafter is only for purposes of illustrating the construction and principles of use of the head support and that such description in connection with an automotive vehicle seat and baby swing is not to be taken in a limiting sense. Thus, the infant head support will be equally usable and is also equally effective in other forms of infant retaining devices, as heretofore described.

Referring now to FIG. 1, P designates a prior art space filling device which is primarily used with an automotive vehicle seat and which is promoted as a device to support a child in an auxiliary automotive vehicle seat. However, the article provides little support, if any, and serves to primarily assume excess space between an infant and an infant retaining device.

This prior art device P is generally comprised of a sheet of foam material 10 having a recessed portion 12 formed therein. The recessed portion 12 includes a somewhat arcuately shaped recessed portion 14 and a second recessed portion 16. The recessed portion 14 is designed to receive the head and the recessed portion 16 is designed to receive the torso section of the infant. A pair of grooves 18 exist between the recessed portions 14 and 16 on each of the opposite sides of the device P to receive the shoulder straps of an auxiliary vehicle seat.

One of the primary and significant problems with this prior art device P is the fact that the entire recess is very shallow and does not extend through the foam sheet itself. This recess is only about one-fourth to one-half inch deep and does not adequately retain the infant. Moreover, beveled sections, such as inclined edges, lead from the recess to the upper surface of the foam sheet, thereby actually facilitating the unauthorized rolling of the infant out of the very recess provided to help retain the infant.

In addition to the above, the foam sheet of this prior art device P is formed of a material which is not sufficiently rigid to absorb the impact of an infant's head when moved in a lateral direction. Moreover, this device P does not adequately support the shoulders and upper arms relative to the head and neck of the infant, thereby permitting sudden jolting movements of an infant's head. Accordingly, this type of prior art device P is not effective in supporting the head of an infant in a vehicle seat. Another one of the problems with this prior art device P is the fact that it is necessary to properly fit the shoulder straps of the auxilary seat into the grooves 18 to secure the device and to remove these straps from the grooves 18 when removing the prior art device P.

The other commercially available prior art device, known as the "Heads Up" device, also has many drawbacks for use as a head support, as mentioned above. Moreover, the flexible fabric cloth back of this prior art, "Heads Up" device, has no structural integrity and is difficult to position within a retaining device. The user is required to hold the device in place and simultaneously place the infant in the device.

In addition to the foregoing, each of the prior art devices is not readily removeable from the infant retaining device, particularly when a safety harness or safety belt is employed. In the case of an automobile auxiliary seat, the auxiliary seat often includes its own safety harness or belt. For example, the "Heads Up" space filing device includes openings in the rear portions thereof to receive the belts. Thus, when it is desired to remove this space filling device from the seat, it is necessary to disconnect the belts in some cases and remove the belts from the openings, and thereafter remove the space filling device. Manipulation in a confined area between the rear of the prior art space filling devices and the seat is cumbersome and time consuming. This difficulty becomes even more pronounced if one is carrying an infant and simultaneously attempting to remove the space filling device.

Referring now in more detail by reference to FIGS. 2-5 of the drawings, there is illustrated a first embodiment of a head support H-1 which is preferably cut from a sheet of foam material and exists in the form of a foam member 20, as illustrated. The member 20 comprises front and back walls 22 and 24, respectively, and has a somewhat arcuately shaped peripheral side wall 26.

The foam member 20 is provided with a first opening 30 extending between the front wall 22 and the back wall 24 and which is shaped to somewhat conform to the head of an infant, in the manner as illustrated in FIGS. 2 and 4. This opening 30 is sized to receive the head of an infant C, schematically illustrated in FIG. 4 and the head of which is represented by reference numeral 32. A second opening 34, extending between the front wall 22 and the back wall 24, is sized to receive the shoulders and upper arms of the infant, also in the manner as illustrated in FIG. 4.

By further reference to FIGS. 2 and 4, it can be observed that the opening 30 is surrounded by a pair of interiorly presented spaced apart, generally vertically arranged wall sections 38 connected by an upper arcuately shaped wall section 39 to form a somewhat inverted U-shaped opening. The opening 34 is defined by a pair of opposed somewhat vertically disposed wall sections 40. The wall sections 40 integrally merge into the generally vertically disposed wall sections 38 by means of inclined (somewhat downwardly presented) shoulder sections 42. These shoulder sections 42 are adapted to engage the shoulder regions 44 of an infant, in the manner as illustrated in FIG. 4. In addition, the wall sections 40 are located and sized to engage the upper arm portions of an infant, also in the manner as illustrated in FIG. 4.

It can be observed that the head of the infant is retained within the opening 30 and that the torso portion is retained within the opening 34. In this way, it can be observed that an infant is cushioned against lateral movement in the event of a sudden impact of a vehicle in which an infant may be riding. Moreover, the head of the infant is prevented from uncontrollably rolling to one side or from one side to the other.

FIG. 3 more specifically illustrates a conventional car seat, which in this case, includes a seat section 50 and a pair of upwardly presented arm rests 52 on opposite sides thereof. The arm rests 52 are connected to an upstanding somewhat vertically disposed back wall 54. In addition, the back wall 54 is provided with a pair of forwardly projecting flanges 56 on each of the opposite sides thereof, also in the manner as illustrated in FIG. 3.

This type of conventional car seat is sized to retain the occupant therein, and typically, is sized to accommodate a large age range of children, as for example, from one month to about five years of age. Thus, the car seat is typically larger than desirable for holding and retaining an infant or small child therein. In this case, the head support H-1 may be inserted in the car seat in the manner as illustrated in FIG. 3. It can be observed that the back wall 24 of the head support H-1 is engageable with the vertically disposed back wall 54 of the car seat. In like manner, the vertically arranged portions of the exterior side walls 26 are capable of engaging the interiorly presented surfaces of the flanges 56. In this way, the head support is capable of being removeably retained within the car seat in the manner as illustrated and described.

The conventional car seat may also be provided with its own shoulder harness or shoulder straps, or otherwise, it may be constructed so as to utilize the seat belt of the automotive vehicle. In the car seat illustrated in FIG. 3, this seat is provided with a pair of shoulder straps 57 which extend through slots 58 formed in the vertically disposed back wall 54. The two straps 57 would normally be secured at their forwardmost ends to a pad, or otherwise, they may be connected in a type of T-shaped arrangement to a further strap adapted to be secured to a buckle or like releasable locking mechanism. In the embodiment as illustrated in FIG. 3, it can be observed that the head support of the present invention is located in the auxiliary automotive vehicle seat in a position such that the shoulder straps 57 extends immediately beneath the shoulder sections 42 of the head support. In this way, it is not necesary to physically mount the head support within the auxiliary vehicle seat by extending shoulder straps, or like members, through portions of the head support. The head support will remain in a fixed position as a result of its own structural integrity and the fact that it is yieldably restrained within the walls of the automotive auxiliary vehicle seat.

The head support of the present invention is removeably retained in the sense that it is readily and easily removeable from the car seat or other infant retaining device. Normally, the head support would be positioned and retained in an infant retaining device and would remain there until needed for use in another infant retaining device. Thus, there is no requirement to provide a separate head support for each infant retaining device. Since each of the aforementioned prior art space filling devices was not easily and readily removeable, the user was and is often forced to purchase a separate space filling device for each retaining device.

The head support H-1 is illustrated in a normal uncompressed or undistorted condition in FIG. 3. However, the foam member is formed of flexible and compressible material. Therefore, when positioned about an infant's head and the upper body portion of the infant, the upper portion of the support H-1 will be pushed laterally outwardly somewhat so that the upper portions thereof also engage the flanges 56 of the car seat. Thus, the head support is sufficiently resilient so as to conform to the size and shape of the infant and to fit snugly within the infant retaining device, such as the car seat. When the head support is positioned between the infant and the retaining device, it functions as a wedge, although a somewhat flexible one, to hold the infant securely in a fixed position. In this way, when an infant is retained in the car seat, the infant's head and upper torso section are protected against lateral movement.

The infant head support H-1 may include the member 20, as illustrated in FIGS. 3 and 5, and which may be formed of a somewhat dense yet resilient material, such as a polyurethane foam, etc. The foam material is preferably a foamed plastic, although any of a number of resilient foamed materials may be used for this purpose. In like manner, dense sponge or even somewhat soft rubber materials may also be employed. The foam material is preferably formed of a material which is of a fire resistant or fire retardant composition or may have a fire retardant agent incorporated therein.

The foam member 20 is preferably surrounded by an outer fabric cover 60, in the manner as illustrated in FIG. 5. In this way, the fabric cover may be removed and cleaned or otherwise replaced if it should become soiled or dirty. For this purpose, a suitable zipper or other opening and closing means (not shown) would be provided for purposes of removing the fabric covering 60 from the member 20. The fabric cover 60 would also preferably be impregnated with a fire retardant composition.

FIGS. 6 and 7 illustrate a modified embodiment of an infant head support H-2, also constructed in accordance with and embodying the present invention. This embodiment of the infant head support H-2 is similar to the infant head support H-1, except that it comprises a plurality of adhesive strips 62 on the back wall 24 thereof. These adhesive strips 62 include an adhesive layer 64 with a releasable backing 66. Thus, for purposes of use, the releasable backing 66 could be removed which would enable the adhesive layers to be removably adhesively attached to the back wall of an infant retaining device, such as a conventional car seat, e.g. the back wall 54 of the retaining device in FIG. 3.

FIG. 8 illustrates a conventional baby swing 80 of the type which is suspended from four individual rods or cables 82. Generally, the baby swing has a vertically disposed back wall 84 along with a pair of forwardly projecting vertically disposed side walls 86. In this case, it can be observed that one of the infant head supports, such as the infant head support H-1, is disposed in the baby swing and is engaged by the back wall 84 and the vertically disposed side walls 86. It should also be understood that the infant head support will also conform to the infant and the swing much in the same manner as it conformed to the car seat. In this way, the swing seat will retain the infant's head in a relatively fixed position during movement of the swing.

Thus, in accordance with the above identified construction, it can be observed in FIG. 4 that the infant head support H-1 and in FIG. 6 that the infant head support H-2 are somewhat of an inverted U-shape in cross-section. Thus, the lower portion of the member defines a pair of spaced apart somewhat vertically extending legs which contain the interiorly presented surfaces 40. Moreover, the opening 30 is sized so that it includes an uppermost section and which merges into somewhat vertically arranged arcuate side portions. The side portions of this opening 30 will engage the sides of the infant's head and the upper portion will engage the crown portion of the head of the infant.

The term "infant" or "infant child" is used in the sense of referring to any child having need of a means to support its head from sudden lateral forces which might cause a sudden lateral movement of the child's head. In this respect, this terminology will also include those children who are physically disabled and require some means to support their head against inadvertent and unauthorized lateral movement. Therefore, the terms "infant" and "infant child" are not necessarily used with respect to an age constraint.

Thus, there has been illustrated and described a unique and novel infant head support for retaining the head of an infant child in an infant retaining device and which protects against undesirable lateral movement of the infant's head. The present invention thereby fulfills all of the objects and advantages which have been sought. It should be understood that many changes, modifications, variations and other uses and applications will become apparent to those skilled in the art after considering this specification and the accompanying drawings. Therefore, any and all such changes, modifications, variations, and other uses and applications which do not depart from the spirit and scope of the invention are deemed to be covered by the invention which is limited only by the following claims.

Having thus described my invention, what I desire to claim and secure by letters patent is:

1. An infant head support for removable disposition in an infant retaining device to support the head of an infant in said infant retaining device, said support comprising a somewhat resilient, flexible member having a front wall and a back wall with a first opening extending therethrough between the front and back walls to receive that head of an infant such that the rear portion of the infant's head engages and is supported by the retaining device, said member having a second opening which is larger than the first opening and which is in communication therewith and which is sized to receive a portion of the upper torso of a child, said second opening also extending through the flexible member such that the rear portion of the infant's torso engages and is supported by the infant retaining device, and a somewhat horizontally disposed wall adapted to engage the shoulders of an infant and which merges into a somewhat vertically disposed wall forming the second opening to engage the upper portion of the arms of an infant, said somewhat horizontally disposed wall and somewhat vertically disposed wall extending between the front and back walls such that rearward movement of an infant is restrained by the infant retaining device and lateral movement is restrained by the infant head support with lateral restraining movement of the head support being provided by the infant retaining device.

2. The infant head support of claim 1 further characterized in that the first opening is generally arcuately shaped and is sized to receive an infant's head.

3. The infant head support of claim 1 further characterized in that the somewhat resilient and flexible member is formed of a foam material.

4. The infant head support of claim 1 further characterized in that the infant head support has a peripherally extending outer side wall which extends between the front and back walls and is adapted to fit within and engage the sides of an infant retaining device.

5. An infant head support for removable disposition in an infant retaining device of the type having a back wall and vertically disposed side wall portions and which support is adapted to prevent lateral movement of a head of an infant in the infant retaining device, said infant head support comprising a somewhat arcuately shaped member which is generally of inverted U-shaped in cross-section, said member being comprised of a pair of vertically disposed spaced apart legs adapted to engage the inner surfaces of the vertically disposed side wall portions on the infant retaining device to thereby snuggly but nevertheless removably hold the head support in the infant retaining device, an arcuate upper section extending between and connecting the upper ends of each of said legs, said arcuate upper section having an internally presented arcuately shaped surface adapted to engage the crown and sides of an infant's head, said legs and arcuate upper section having front and rear walls with the rear wall being adapted to engage a surface of the infant retaining device, said internally presented arcuately shaped surface extending between said front and rear walls forming an opening which extends therethrough to receive the head of an infant such that the rear portion of the infant's head engages and is supported by the infant retaining device, and said legs also having interiorly presented surfaces to engage the shoulders and portions of the arms of the infant, such that rearward movement of an infant is restrained by the infant retaining device and lateral movement is restrained by the infant head support with lateral restraining movement of the head, support being provided by the infant retaining device.

6. The infant head support of claim 5 further characterized in that the member is formed of a foam material.

7. The infant head support of claim 5 further characterized in that the head support is formed of a fire retardant material or has a fire retardant composition incorporated therein.

8. The infant head support of claim 5 further characterized in that the retaining device is an auxiliary automotive vehicle seat and the side wall portions are forwardly extending side flanges, the member is formed of a sufficiently resilient material so as to be snugly retained within the flanges on the auxiliary automotive vehicle seat, but which is nevertheless readily and easily removable therefrom.

9. The infant head support of claim 5 further characterized in that an outer fabric cover extends around said member.

10. The infant head support of claim 9 further characterized in that the fabric cover has a fire retardant composition incorporated therein.

11. The infant head support of claim 9 further characterized in that the outer fabric cover is removable from the member.

12. The infant head support of claim 5 further characterized in that at least one adhesive strip is located on a back wall thereof for releasable attachment to an infant retaining device as an auxiliary means to retain the head support on the infant retaining device.

13. The infant head support of claim 5 further characterized in that the legs also form a second opening extending between said front and back walls and which is in communication with and immediately below the first identified opening such that a rear portion of the infant's torso engages and is supported by the infant retaining device.

14. The infant head support of claim 5 further characterized in that the head support can be securely held in an infant retaining device by its compressibility and resiliency so as to wedge against a pair of walls of the retaining device and which thereby eliminates a need of positive attachment.

15. A head support for removable disposition in an auxiliary automotive vehicle seat to support the head of an infant child having weak neck muscles in said auxiliary automotive vechicle seat, said head support comprising a somewhat arcuately shaped member having front and back walls and having a first downwardly projecting opening extending between said front and back walls and sized generally to conform to and extend over the head of the child such that the rear portion of the child's head engages and is supported by a wall of the auxiliary automotive vehicle seat, and a second opening extending between said front and back walls and in communication with and spaced downwardly from said first opening and having a width larger than said first opening to conform to and extend over the shoulders of the child to thereby provide support to the neck and upper torso portion of the child, such that the rear portion of the child's neck and upper torso portion engages and is supported by a wall of the auxiliary automotive vehicle seat and such that rearward movement of the child is restrained by the auxiliary automotive vehicle seat and lateral movement is restrained by the head support.

16. The head support of claim 15 further characterized in that said head support comprises a somewhat resilient member having the first and second openings.

17. The head support of claim 16 further characterized in that the member is formed of a foam material.

18. The head support of claim 15 further characterized in that the head support is formed of a fire retardant foam material or has a fire retardant composition incorporated therein.

19. The head support of claim 15 further characterized in that the second opening communicates with the first opening and extends therefrom through somewhat arcuate inclined sections.

20. A head support for removable but yet tight fitting frictional retention in an auxiliary automotive vehicle seat of the type having a back wall and vertically disposed forwardly projecting side wall portions and which support is adapted to prevent lateral movement of a head of child in the auxiliary automotive vehicle seat, said head support comprising a somewhat arcuately shaped member which is generally of inverted U-shape in cross-section, said member being comprised of a pair of vertically disposed spaced apart legs adapted to engage the inner surfaces of the vertically disposed side wall portions on the auxiliary automotive vehicle seat to thereby snugly, but nevertheless removably hold the head support in the auxiliary automotive vehicle seat, an arcuate upper section extending between and connecting the upper ends of each of said legs, said arcuate upper section having an internally presented arcuately shaped surface adapted to engage the crown and sides of a child's head, said legs and arcuate upper section having front and rear walls with the rear wall being adapted to engage a surface of the auxiliary automotive vehicle seat, said internally presented arcuately shaped surface extending between said front and rear walls forming an opening which extends therethrough to receive the head of a child such that the rear portion of the child's head engages and is supported by the auxiliary automotive vehicle seat, and said legs having interiorally presented surfaces to engage the shoulders and portions of the arms of the child.

21. The head support of claim 20 further characterized in that the member is formed of a foam material.

22. The head support of claim 20 further characterized in that the legs also form a second opening extending between said front and back walls and which is in communication with and immediately below the first identified opening such that a rear portion of the child's torso engages and is supported by the retaining device.

* * * * *